US009373256B2

(12) United States Patent
Sandbrook

(10) Patent No.: US 9,373,256 B2
(45) Date of Patent: Jun. 21, 2016

(54) VEHICLE PRESENCE DETECTION SYSTEM

(71) Applicant: Frogparking Limited, Palmerston North (NZ)

(72) Inventor: Donald H. Sandbrook, Palmerston North (NZ)

(73) Assignee: Frogparking Limited, Palmerston North (NZ)

( * ) Notice: Subject to any disclaimer, the term of this patent is extended or adjusted under 35 U.S.C. 154(b) by 0 days.

(21) Appl. No.: 14/534,972

(22) Filed: Nov. 6, 2014

(65) Prior Publication Data

US 2016/0133125 A1    May 12, 2016

(51) Int. Cl.
*G08G 1/01* (2006.01)
*H04W 4/00* (2009.01)
*G06Q 10/00* (2012.01)

(52) U.S. Cl.
CPC ............... *G08G 1/012* (2013.01); *G06Q 10/00* (2013.01); *H04W 4/00* (2013.01)

(58) Field of Classification Search
CPC ............................... H04W 4/00; G06Q 10/00
See application file for complete search history.

(56) References Cited

U.S. PATENT DOCUMENTS

| 8,279,107 B2 | 10/2012 | Krstanovic | |
|---|---|---|---|
| 2001/0052860 A1 | 12/2001 | McMaster | |
| 2009/0098903 A1* | 4/2009 | Donaldson | G01S 19/258 455/552.1 |
| 2011/0099126 A1* | 4/2011 | Belani | G06Q 30/0284 705/418 |
| 2013/0106621 A1* | 5/2013 | Cecchet | G08G 1/146 340/932.2 |

FOREIGN PATENT DOCUMENTS

| EP | 1772838 | 6/2010 |
|---|---|---|
| WO | WO2013114139 | 8/2013 |

* cited by examiner

*Primary Examiner* — Shirley Lu
(74) *Attorney, Agent, or Firm* — Neustel Law Offices; Michael S. Neustel

(57) ABSTRACT

A vehicle presence detection system for effectively detecting the presence of a vehicle in a location based upon a measured radio wave signal strength by a receiver. The vehicle presence detection system generally includes a main receiver adapted for receiving a radio wave signal from a transmitter and a control unit in communication with the main receiver that determines a signal strength of the radio wave signal received by the main receiver. The control unit determines that a vehicle is near the transmitter or the main receiver when the signal strength of the radio wave signal is reduced by a threshold loss.

20 Claims, 15 Drawing Sheets

VEHICLE PRESENCE DETECTION SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION

1. Field of the Invention

The present invention relates generally to a vehicle detection system and more specifically it relates to a vehicle presence detection system for effectively detecting the presence of a vehicle in a location based upon a measured radio wave signal strength by a receiver.

2. Description of the Related Art

Any discussion of the related art throughout the specification should in no way be considered as an admission that such related art is widely known or forms part of common general knowledge in the field.

In areas of high traffic density where parking is at a premium, it is often times difficult to find an available parking space. The driver of a vehicle wastes valuable time and becomes frustrated while driving around a parking lot to find a parking space. The additional searching for a parking space also compounds traffic congestion and has a negative impact on the environment by the extended operation of the vehicle.

To assist drivers in locating a parking space, conventional occupancy indicators have been recently developed that indicate whether an individual parking space is available. Conventional occupancy indicator systems are comprised of a visual indicator (e.g. a light) that is mounted in each individual parking space (typically to the ceiling or wall of an indoor vehicle parking structure) and a sensor that detects the presence of a vehicle within the individual parking spot. The occupancy indicator is directly wired to the sensor to allow for communications from the sensor to the occupancy indicator. The occupancy indicator and sensor are further wired to a central parking management system that communicates with the devices and also provides electrical power to the devices.

Sensors for vehicle detecting in parking spaces have also been known in the art for the purpose of guiding traffic or enforcement. Conventional sensors for detecting the presence of vehicles include infra-red systems, magnetometer systems, image processing systems and inductive loops. The problem with infra-red systems is that they rely upon a translucent window through an enclosure that is prone to damage or blockage rendering the infra-red system useless. The problem with magnetometer systems is that they use disruptions in the earth's magnetic field caused by the presence of a vehicle which can be small and unpredictable along with being temperature dependent resulting in a low level of detection accuracy. The problem with image processing systems is they are complicated making them prone to errors. The problem with inductive loops is they are impractical to install and are unreliable so they are often times used for entry and exit points as opposed to individual parking spaces.

Because of the inherent problems with the related art, there is a need for a new and improved vehicle presence detection system for effectively detecting the presence of a vehicle in a location based upon a measured radio wave signal strength by a receiver.

BRIEF SUMMARY OF THE INVENTION

The invention generally relates to a vehicle detecting system which includes a main receiver adapted for receiving a radio wave signal from a transmitter and a control unit in communication with the main receiver that determines a signal strength of the radio wave signal received by the main receiver. The control unit determines that an object (e.g. vehicle) has been positioned in the direct radio wave path between the transmitter and receiver when the signal strength of the radio wave signal is reduced by a threshold loss.

There has thus been outlined, rather broadly, some of the features of the invention in order that the detailed description thereof may be better understood, and in order that the present contribution to the art may be better appreciated. There are additional features of the invention that will be described hereinafter and that will form the subject matter of the claims appended hereto. In this respect, before explaining at least one embodiment of the invention in detail, it is to be understood that the invention is not limited in its application to the details of construction or to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE INVENTION

A. Overview

Figure 1:
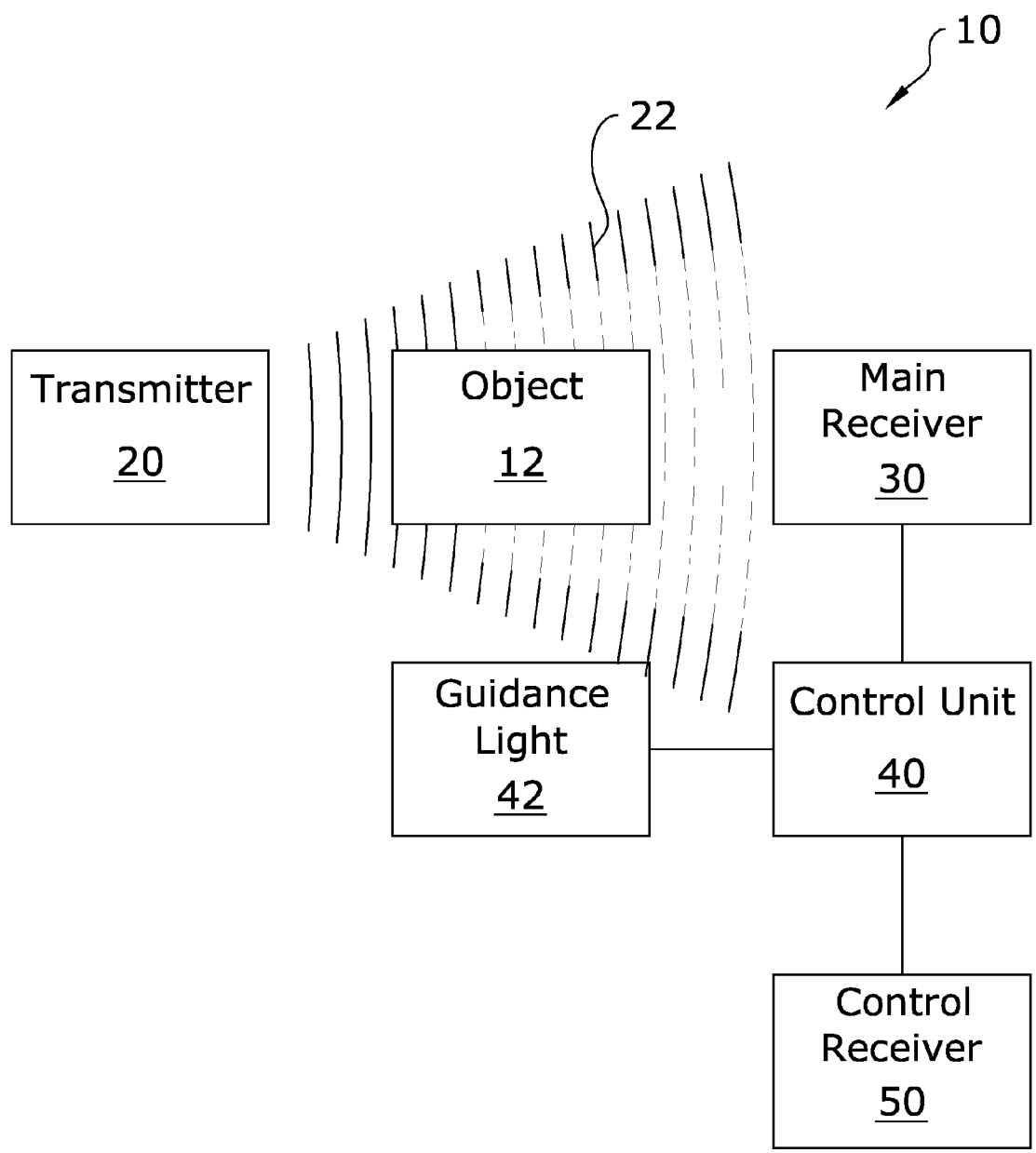
FIG. 1 is a block diagram of the present invention.
Figure 2:
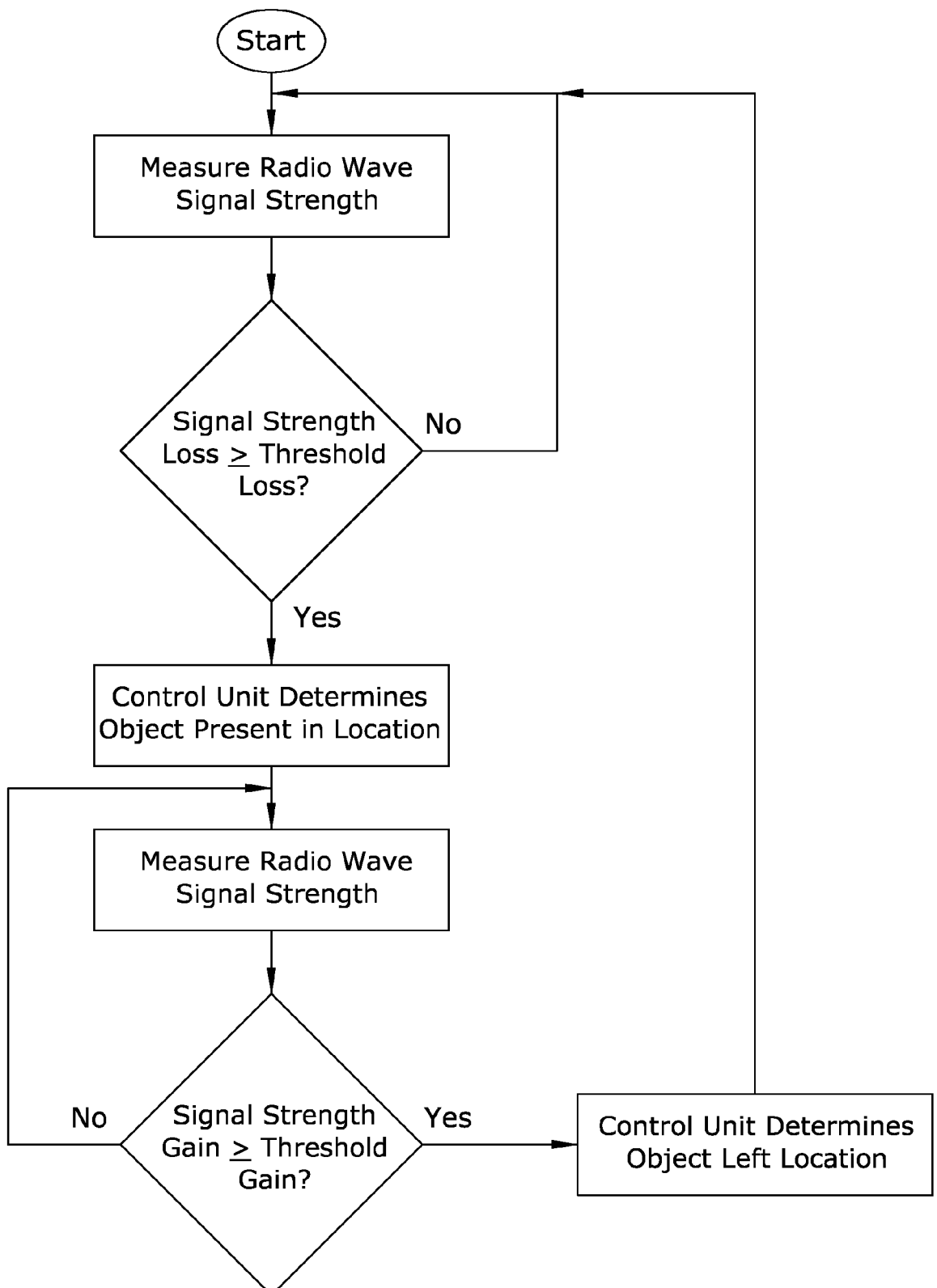
FIG. 2 is a flowchart illustrating the overall functionality of the present invention.
Figure 3:
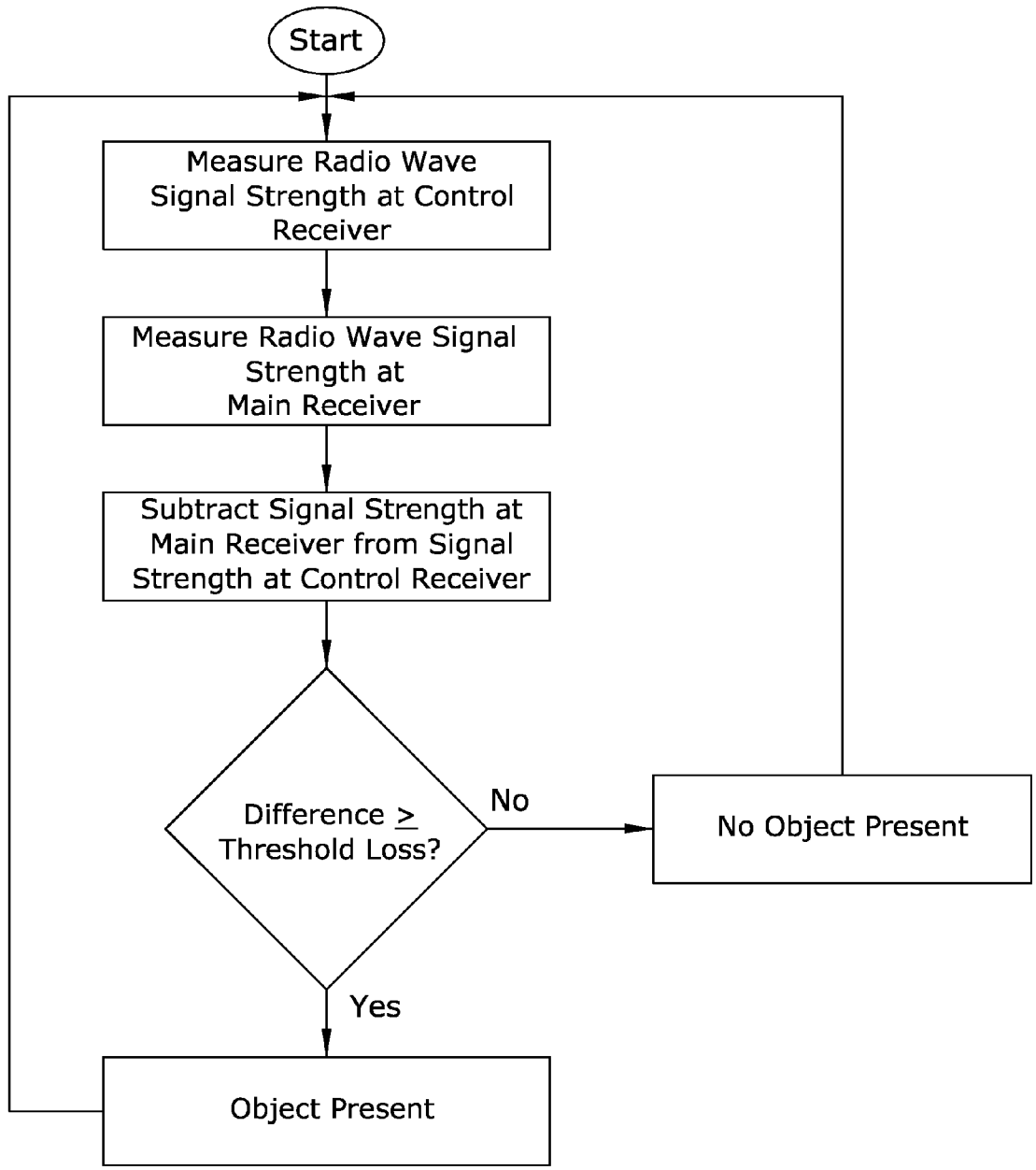
FIG. 3 is a flowchart illustrating the overall functionality of the present invention utilizing a control receiver.

Turning now descriptively to the drawings, in which similar reference characters denote similar elements throughout the several views, FIGS. 1 through 10 illustrate a vehicle presence detection system 10, which comprises a main receiver 30 adapted for receiving a radio wave signal 22 from a transmitter 20 and a control unit 40 in communication with the main receiver 30 that determines a signal strength of the radio wave signal 22 received by the main receiver 30. The control unit 40 determines that a vehicle is near the main receiver 30 and/or the transmitter 20 when the signal strength of the radio wave signal 22 is reduced by a threshold loss. Various types of radio wave signals 22 may be utilized with the present invention such as, but not limited to, Wi-Fi, Bluetooth, Bluetooth Low Energy, ISM radio, cellular, global positioning systems (GPS) and the like. The signal path may be obstructed by an object 12 either in a vertical manner, horizontal manner or any angle between thereof. The present invention may be utilized within outdoor (e.g. outdoor parking lots) and indoor applications (e.g. vehicle parking ramps).

B. Transmitter

The transmitters 20 transmit a radio wave signal 22 to the main receiver 30 along a signal path as illustrated in FIGS. 1 and 4a through 8 of the drawings. The strongest signal path is the shortest, unobstructed direct path between the transmitter 20 and the main receiver 30. The signal path may be at various orientations such as horizontally orientated or vertically orientated. The main receiver 30 detects the radio wave signal 22 and determines the signal strength (power) therefore, it is this signal strength that is used to determine whether or not an object 12 (e.g. a vehicle) is positioned between the transmitter 20 and the main receiver 30. The transmitter 20 is preferably comprised of a relatively low profile structure that is attached to the upper surface 16 of the parking lot 17 thereby avoiding boring into the parking lot 17.

As illustrated in FIGS. 4a through 9 of the drawings, the transmitter 20 is attached to an upper surface 16 such as the surface of a parking lot 17 having a plurality of parking spaces. The transmitter 20 may be attached to the upper surface 16, a ceiling 14 or other structure with conventional fasteners (e.g. screws, bolts, adhesive, adhesive tape and the like).

Figure 9:
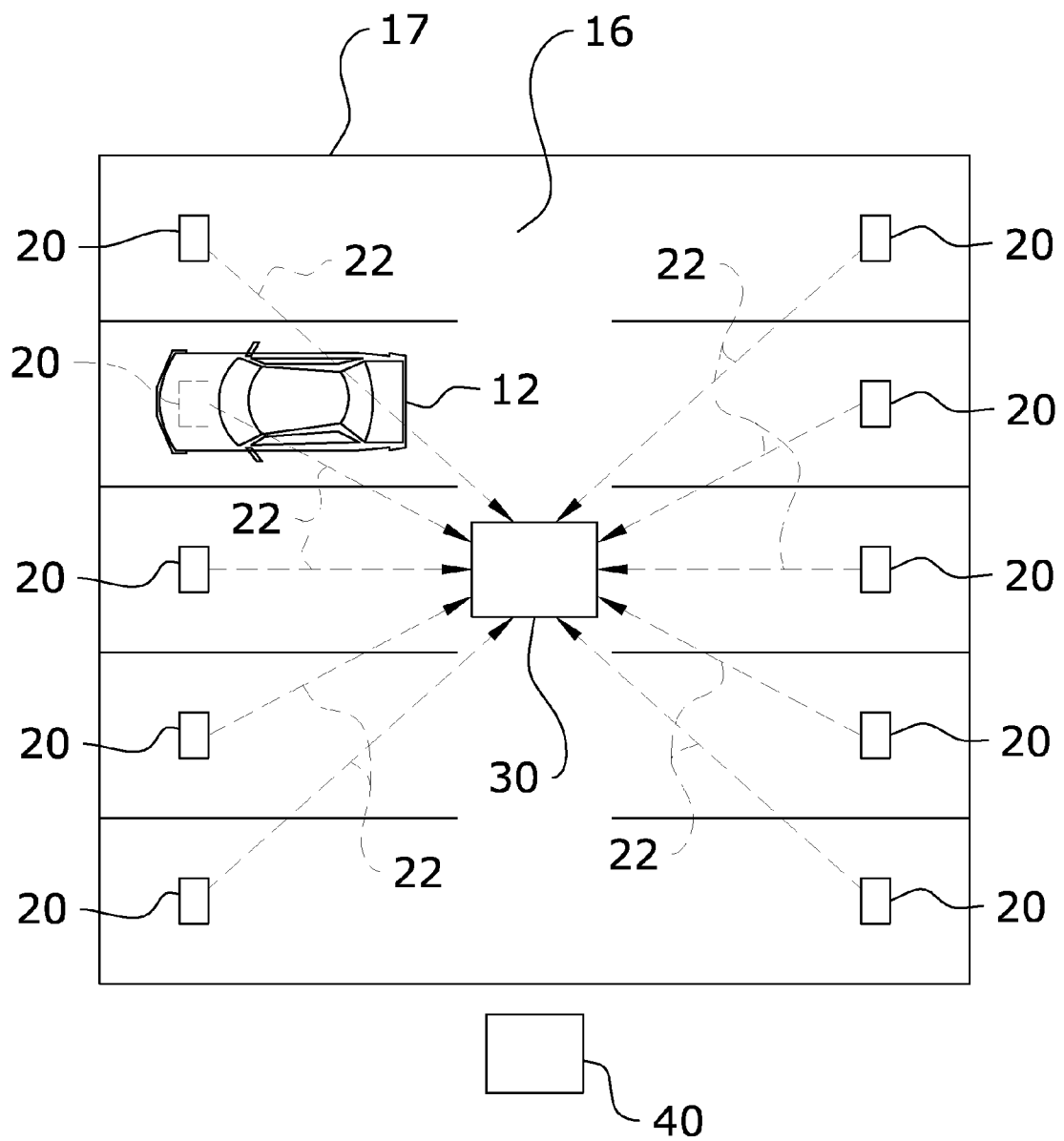
FIG. 9 is a top view of a parking lot with a plurality of transmitters attached to each parking space of the parking lot.
Figure 10:
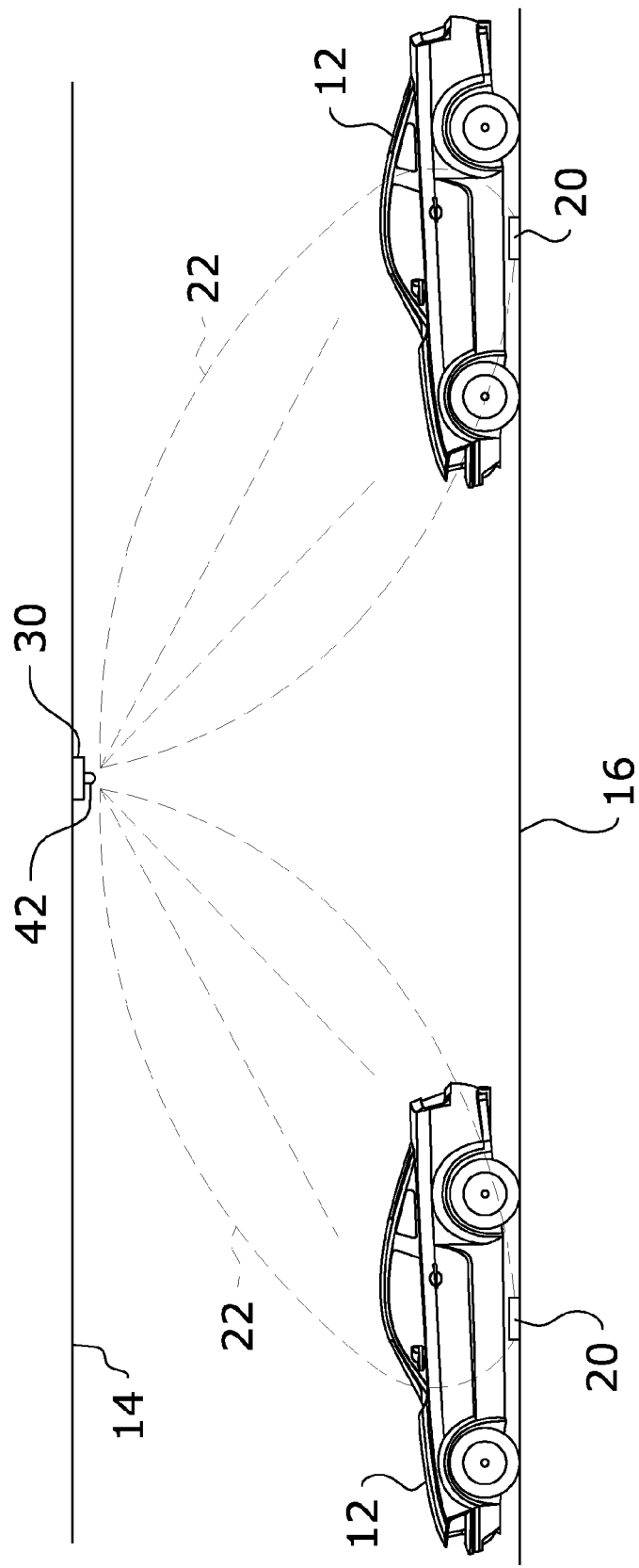
FIG. 10 is a side view illustrating multiple transmitters transmitting signals to the main receiver.

The upper surface 16 is preferably horizontally orientated as further illustrated in FIGS. 4a through 8 of the drawings. The transmitter 20 is attached to a parking space within a parking lot 17 for vehicles so that when a vehicle is parked in the parking space the vehicle substantially covers the transmitter 20 as illustrated in FIGS. 9 and 10 of the drawings.

As is well known, a radio wave signal 22 is comprised of electromagnetic waves. The radio wave signal 22 may also be comprised of various frequencies such as 3 kHz to 300 GHz. The radio wave signal 22 has a reduction in power density (a.k.a. path loss or path attenuation) as it propagates through space due to various factors such as propagation losses due to the natural expansion of the electromagnetic waves in space, absorption losses (a.k.a. penetration losses) due to the electromagnetic waves passing through a media not transparent to the electromagnetic waves, diffraction losses due to the electromagnetic waves obstructed by an opaque object 12 and losses caused by other phenomena.

One or more transmitters 20 may be used within the present invention. Each transmitter 20 is preferably positioned upon the upper surface 16 of an associated parking space in the parking lot 17 as illustrated in FIG. 9 of the drawings. Each transmitter has a unique identifier associated with the transmitter and the corresponding parking space so that the control unit 40 is able to identify which transmitter in a particular parking space is transmitting a particular radio wave signal 22. FIG. 9 illustrates a single main receiver 30 being used to monitor the signals 22 received from 10 different transmitters 20 in 10 different parking spaces in the parking lot 17. When a vehicle 12 is positioned above or near a transmitter 20, the corresponding signal strength for that transmitter 20 is reduced as detected by the main receiver 30 and the control unit 40 is then able to determine that a vehicle 12 is parked in the parking space corresponding to the transmitter 20. A plurality of main receivers 30 are used in a parking garage attached to the ceiling 14 corresponding to groups of parking spaces (e.g. 2 opposing parking spaces, 2 adjacent parking spaces, a cluster of 4 parking spaces having 2 parking spaces opposite 2 other parking spaces, etc.). Each main receiver 30 is preferably attached to the ceiling 16 in a central location of the group of transmitters 20 being monitored by the main receiver 30. The main receiver 30 only monitors the signals 22 from the transmitters 20 in the group of transmitters 20 being monitored and the main receiver 30 and/or the control unit 40 ignore the signals from transmitters 20 not part of the group of transmitters 20 being monitored by the main receiver 30.

The transmitter 20 may be comprised of any device that transmits a radio wave signal 22 with a frequency of 3 kHz to 300 GHz. Other frequencies greater than or less than this range may be used, but it is preferable that the radio wave signal 22 be between 3 kHz to 300 GHz.

The transmitter 20 may be comprised of a Bluetooth device that transmits a Bluetooth signal. The transmitter 20 may be comprised of a low-powered Bluetooth device such as a low energy proximity transmitter that has a unique identifier such as the IBEACON® manufactured by Apple Inc. The transmitter 20, the main receiver 30 and/or the control receiver 50 may be comprised of a transceiver device for allowing bi-direction communications. Various other wireless technologies may be used for the transmitter 20 and the main receiver 30.

FIGS. 6a through 8 illustrate the transmitter 20 being comprised of a satellite that produces the radio wave signal 22 and a plurality of main receivers 30 attached to the upper surface 16 of the parking lot 17 corresponding to each parking space (each main receiver 30 has its own unique identifier and is in communication with the control unit). The satellite may be an existing satellite originally intended for a different purpose (e.g. a satellite that is part of a space-based satellite navigation system such as a global positioning satellite) or a satellite specifically intended to send a radio wave signal 22 for detection by the main receiver 30. Global positioning satellites send a signal that has satellite location information so that the main receiver 30 and/or the control unit 40 is able to calculate the position of the satellite providing the radio wave signal 22. Hence, the control unit 40 is able to use one or more selected satellite signals based upon the location of the satellite. For example, if the main receiver 30 is located near a vertical structure (e.g. wall, building), the main receiver 30 and control unit 40 can be programmed to only consider signals from satellites that are not obstructed by the vertical structure. Using satellite signals that are not obstructed by a vertical obstacle is important to ensuring that a strong signal strength is used.

It can be appreciated that the transmitter 20 may be comprised of various other devices that are capable of transmitting a radio wave signal 22 that is detectable by a main receiver 30 and wherein the radio wave signal 22 incurs a reduction in power density when passing through a physical object 12 such as a vehicle. It is preferred that the weaker signals from other satellites are filtered out and only the strongest signal from a single satellite is used.

C. Control Unit

The control unit 40 may be integrally formed with the main receiver 30 or separate from the main receiver 30. The control unit 40 may be comprised of any electronic device having a microprocessor capable of performing data calculations, storing data and transmitting data such as a computer. A guidance light 42 or other type of display is in communication with the control unit 40 for use in indicating the presence of a vehicle in a parking spot in a parking lot 17. The control unit 40 also may be in communication with a remote computer (e.g. web server) via a communications network such as a global computer network. The control unit 40 may access the communications network directly or via a gateway device. The control unit 40 determines that a vehicle is present in a parking spot when the main receiver 30 detects a signal strength for the radio wave signal 22 that is at or below a minimum signal strength (e.g. any signal strength measured at or below 16 dBm). Alternatively, the control unit 40 determines that a vehicle is present when there is a change and reduction in the signal strength (e.g. five minutes ago there was a strong signal and now there is a weak signal). The control unit 40 may require the newly detected condition of a weaker signal to last for at least a period of time to avoid false detections of a vehicle or human just passing over the main receiver 30 (e.g. at least one minute the reduced signal strength is detected).

The control unit 40 is in communication with the main receiver 30 via a wired connection or a wireless connection. The control unit 40 determines the current signal strength of the radio wave signal 22 received by the main receiver 30 and determines whether an object 12 such as a vehicle is near the main receiver 30 based on when the signal strength of the radio wave signal 22 is reduced by a threshold loss. The control unit 40 preferably determines that the object 12 such as a vehicle is present when the object 12 is positioned between the transmitter 20 and the main receiver 30 as illustrated in FIGS. 4b, 4c, 5b, 6b, 7b and 8 of the drawings. The dashed portion of the radio wave signal 22 indicates a reduction in the power density of the radio wave signal 22 due to reflection and/or absorption of the radio wave signal 22 by the object 12. Since a vehicle has a significant amount of metal, the reduction in power density measured by the main receiver 30 when a vehicle is present compared to the power density of the radio wave signal 22 when no vehicle is present is significant.

The threshold loss used to determine the presence of the object 12 may be comprised of various levels of reduction in power density such as, but not limited to, a twenty-percent reduction in power density of the radio wave signal 22 from a historical average signal strength measured by the main receiver 30 (and/or the control receiver 50). For example, if the signal strength of the radio wave signal 22 measured by the main receiver 30 averages 20 dBm (decibel-milliwatts) and the threshold loss is twenty-percent (i.e. a reduction in power density of the radio wave signal 22 measured by the main receiver 30 of 4 dBm or greater), then the control unit 40 determines that a vehicle is present if the main receiver 30 detects a signal strength of 16 dBm or less. To further the example, if the main receiver 30 detects a signal strength of greater than 16 dBm, then the control unit 40 determines that a vehicle is not present. The average measured signal strength may be adjusted over time due to additional measurements and the control unit 40 adjusts its data calculations accordingly to compensate for the change in average signal strength.

Alternatively, the control unit 40 calculates various changes in the signal strength of the radio wave signal 22 over a period of time due to various factors (e.g. weather conditions) and averages the measured changes to provide an average change in the signal strength of the radio wave signal 22. The average change in power density is used to provide information about the typical changes in the power density (increased or decreased) over a normal period of time not caused by a vehicle being positioned between the transmitter 20 and the main receiver 30. The control unit 40 determines that the vehicle is present if a change in the signal strength of the radio wave signal 22 is greater than a minimum threshold change such as a multiple of the average change (e.g. four times the average change). For example, if the average change in signal strength is 1 dBm and the minimum threshold change is 4 dBm, then the control unit 40 determines that a vehicle is present if the main receiver 30 detects a reduction in signal strength of 4 dBm or more. To further the example, if the main receiver 30 detects a signal strength of greater than 16 dBm, then the control unit 40 determines that a vehicle is not present. The minimum threshold change in signal strength may be adjusted over time due to additional measurements and the control unit 40 adjusts its data calculations accordingly to compensate for the change in minimum threshold change signal strength (e.g. if the control unit 40 measures a greater average change such as 1.5 dBm, the control unit 40 increases the minimum threshold changes to such as 6 dBm).

Alternatively, vehicle detection using a Bluetooth signal preferably takes its indications from three tests, when calibrated. The first test determines if the current point has moved closer to a threshold that is not its current state a flag is recorded to indicate the direction of the change. The second test determines if the total continuous change exceeds (either positively or negatively) four times the running average of deviations, a flag is set to indicate as such. The third and final test determines if the standard deviation taken across a number of the most recent points is greater than 2.5 times the running average for standard deviation, the last required flag is set. Flag values maybe weighted by the tests based on the confidence of the test result e.g. in the third test having a threshold of 2.5 times the running average for the standard deviation, if the value was 5 times the running average, this test could be given greater weight in the final detection decision. Depending on the result of the three flag values, which may or may not have been weighted by the tests, the algorithm returns either that there is no vehicle detected, or that there is a vehicle detected.

Alternatively, vehicle detection using GPS satellites preferably uses running averages and instantaneous values for determining the state. The current value is compared to low and high threshold levels. If the distance to either threshold (high or low) is less than 30% of the distance to the opposing threshold, this indicates a change in state. The low and high thresholds are determined from the running average when the signal path is obstructed or unobstructed (e.g. occupied or unoccupied) as appropriate.

Figure 7A:
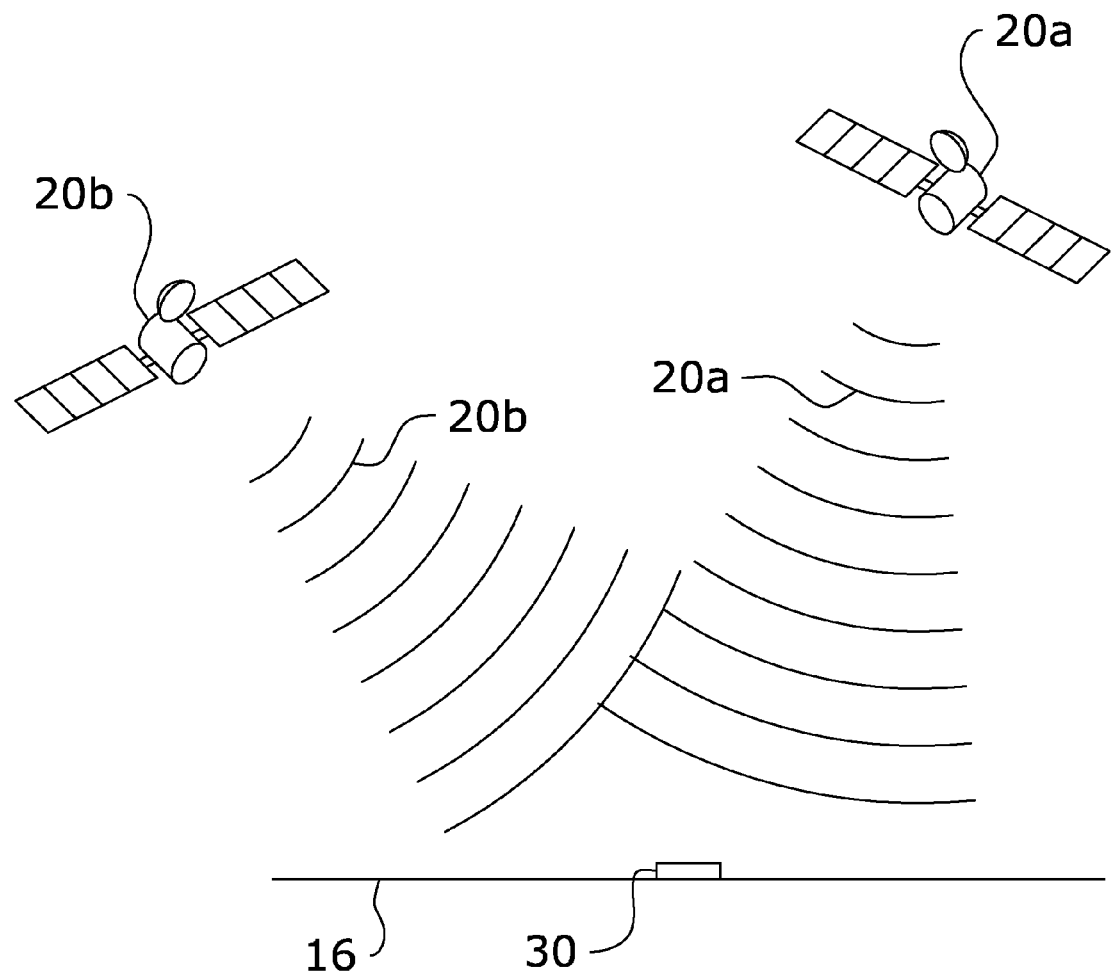
FIG. 7a is a front view of two transmitters comprised of satellites transmitting two radio wave signals to a main receiver.
Figure 7B:
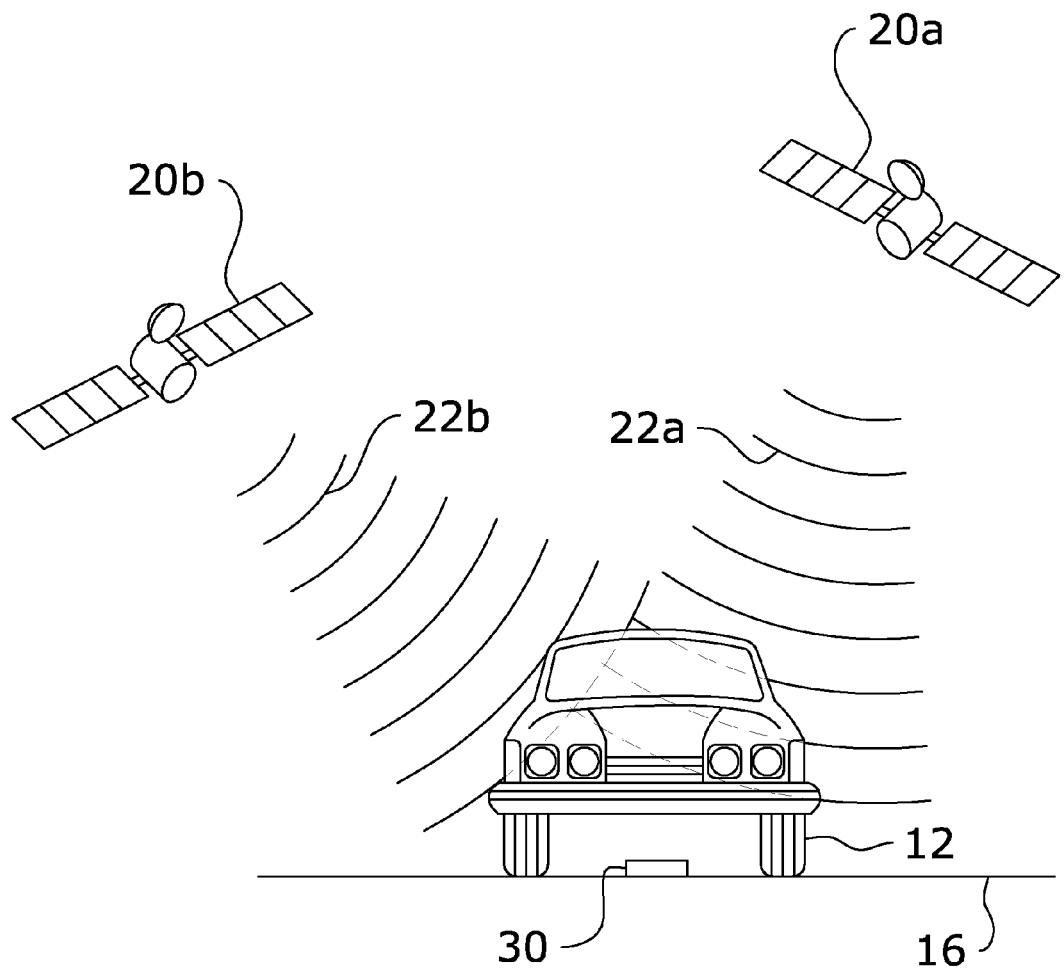
FIG. 7b is a front view of transmitters of FIG. 7a with an object positioned between thereof.
Figure 8:
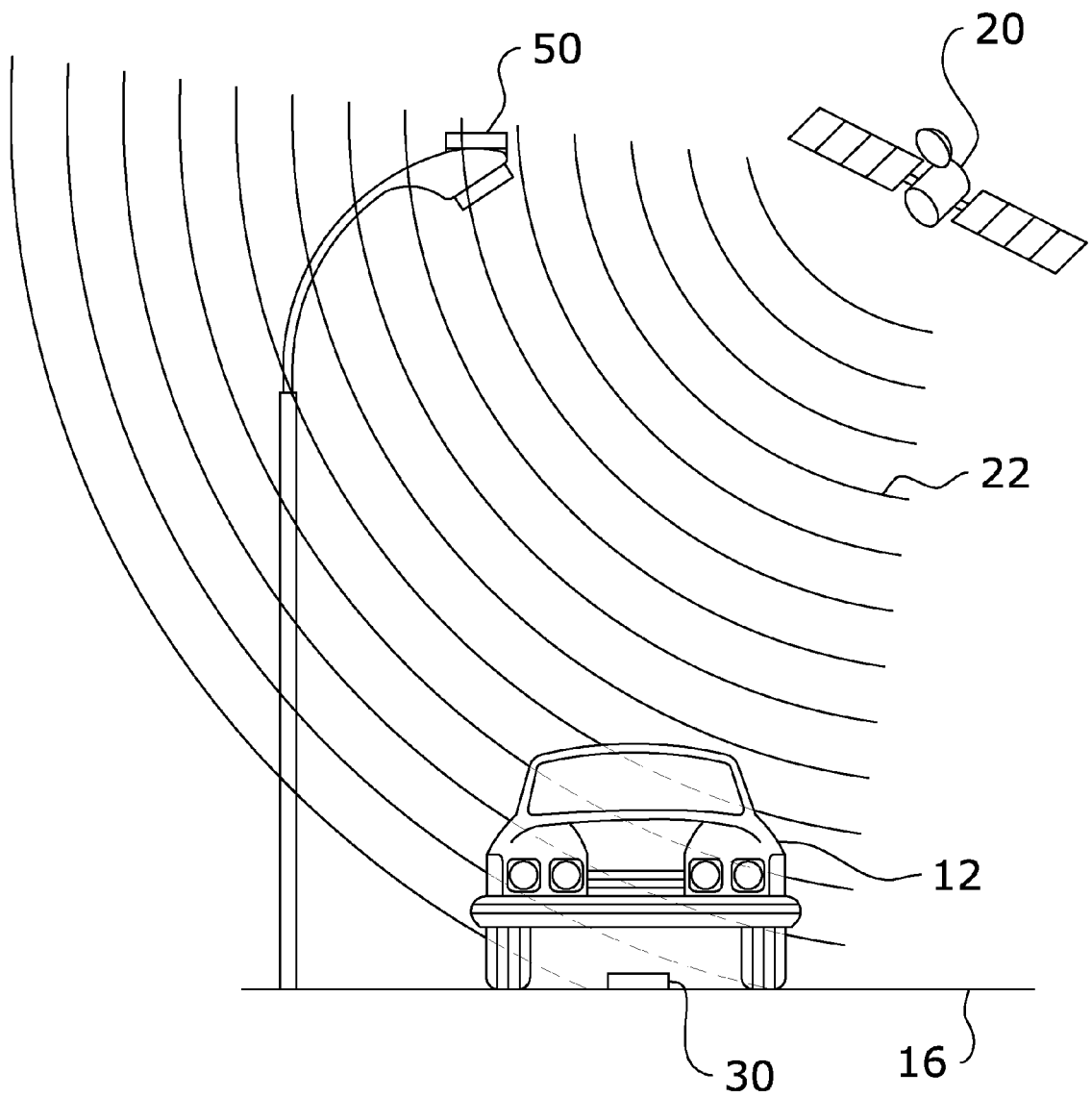
FIG. 8 is a front view of the main receiver and a transmitter along with a control receiver attached to an upper portion of a pole.

When two or more radio wave signals 22 from different transmitters 20 are received by the main receiver 30 as illustrated in FIGS. 7a and 7b, the main receiver 30 preferably utilizes the most relevant radio wave signal 22, or a combination thereof. As illustrated in FIG. 7b, two satellites 20a, 20b provide two corresponding radio wave signals 22a, 22b. Since the first satellite 20a has a greater elevation than the second satellite 20b, the respective first signal 22a has a greater vertical orientation than the second signal 22b. Due to the vertical nature of first signal 22a, it is more likely to suffer a significant degradation when obstructed by an object 12, making this signal more relevant. It is possible that the second signal 22b passes under the object 12, due to its more horizontal orientation, and does not suffer signification degradation, making this signal less relevant. The control unit 40 utilizes the most relevant first signal 22a to determine if an object 12 is positioned between the satellite 20a and the main receiver 30. The criteria for the relevance of the signals (e.g. elevation of the satellites, angle of the satellites) may be configurable by the main system or pre-set at time of manufacture to provide increased reliable results. For example, the main receiver 30 may only read and use the signals from a satellite within a certain angle above horizontal (e.g. fifty-degrees or greater above horizontal) forming an inverted cone area wherein signals from satellites outside of the area are not used. Furthermore, when the main receiver 30 is positioned near a vertical structure (e.g. a building, a wall), it is preferable to have the main receiver 30 only detect and use the signals from satellites that are at an angle such that the radio wave signal is not obstructed by the vertical structure.

Figure 4A:
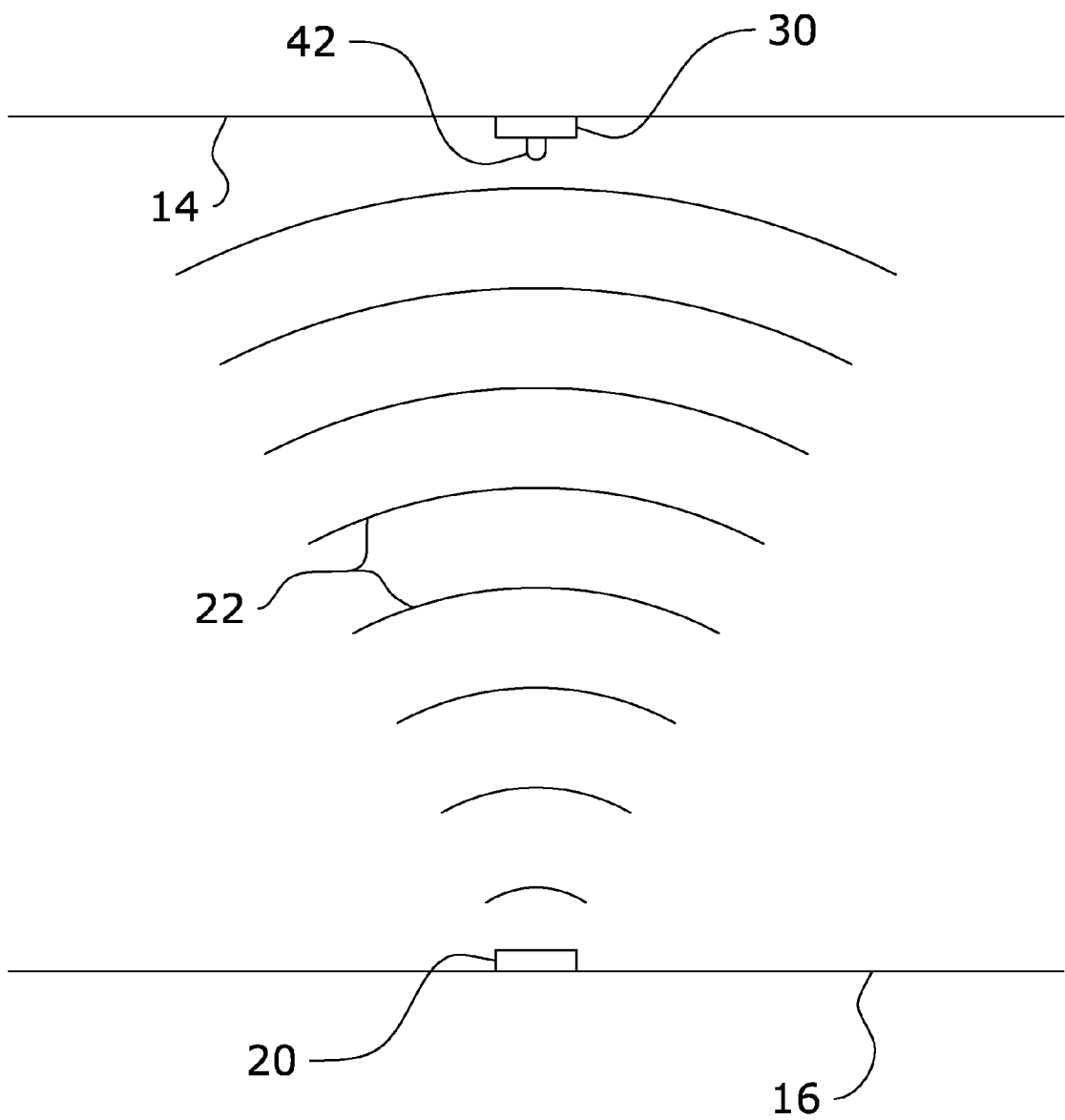
FIG. 4a is a front view of a main receiver positioned above a transmitter.
Figure 4B:
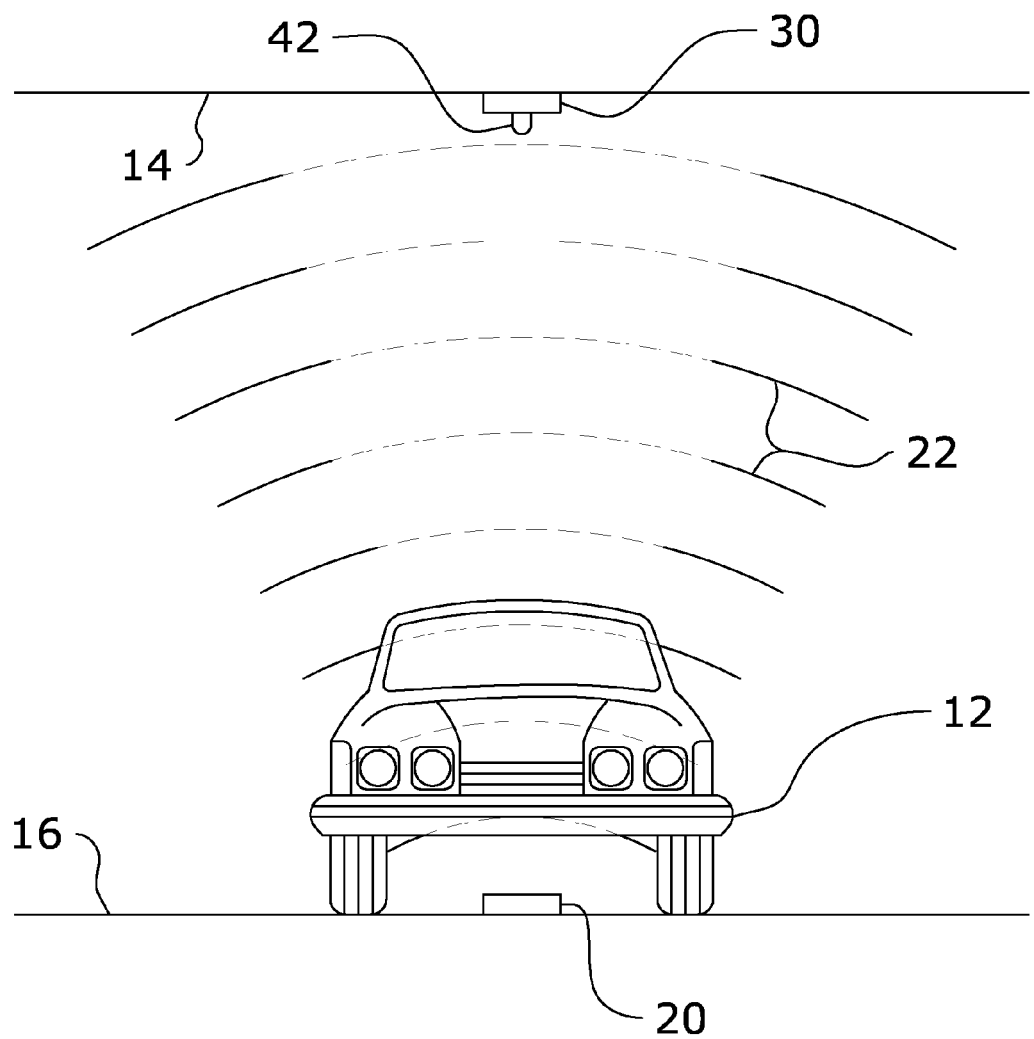
FIG. 4b is a front view of the main receiver positioned above the transmitter with an object positioned between thereof.
Figure 4C:
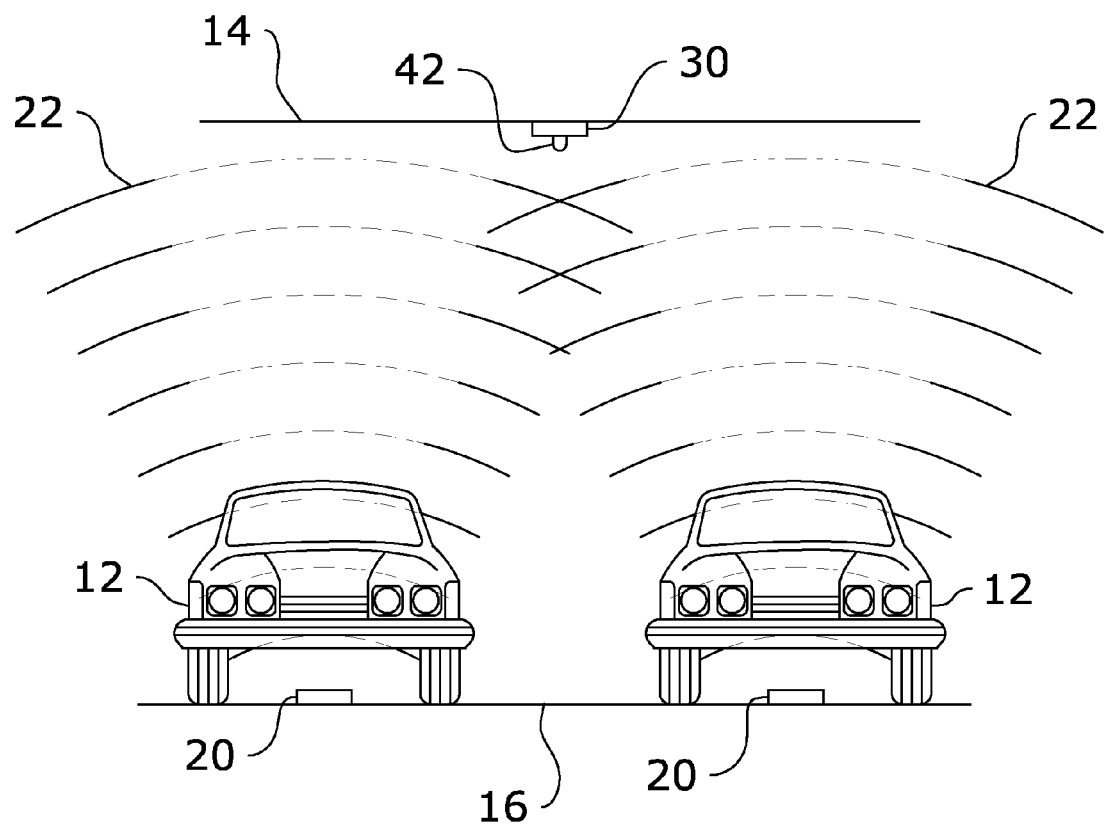
FIG. 4c is a front view of the main receiver positioned above two transmitters with two objects positioned between thereof.
Figure 5A:
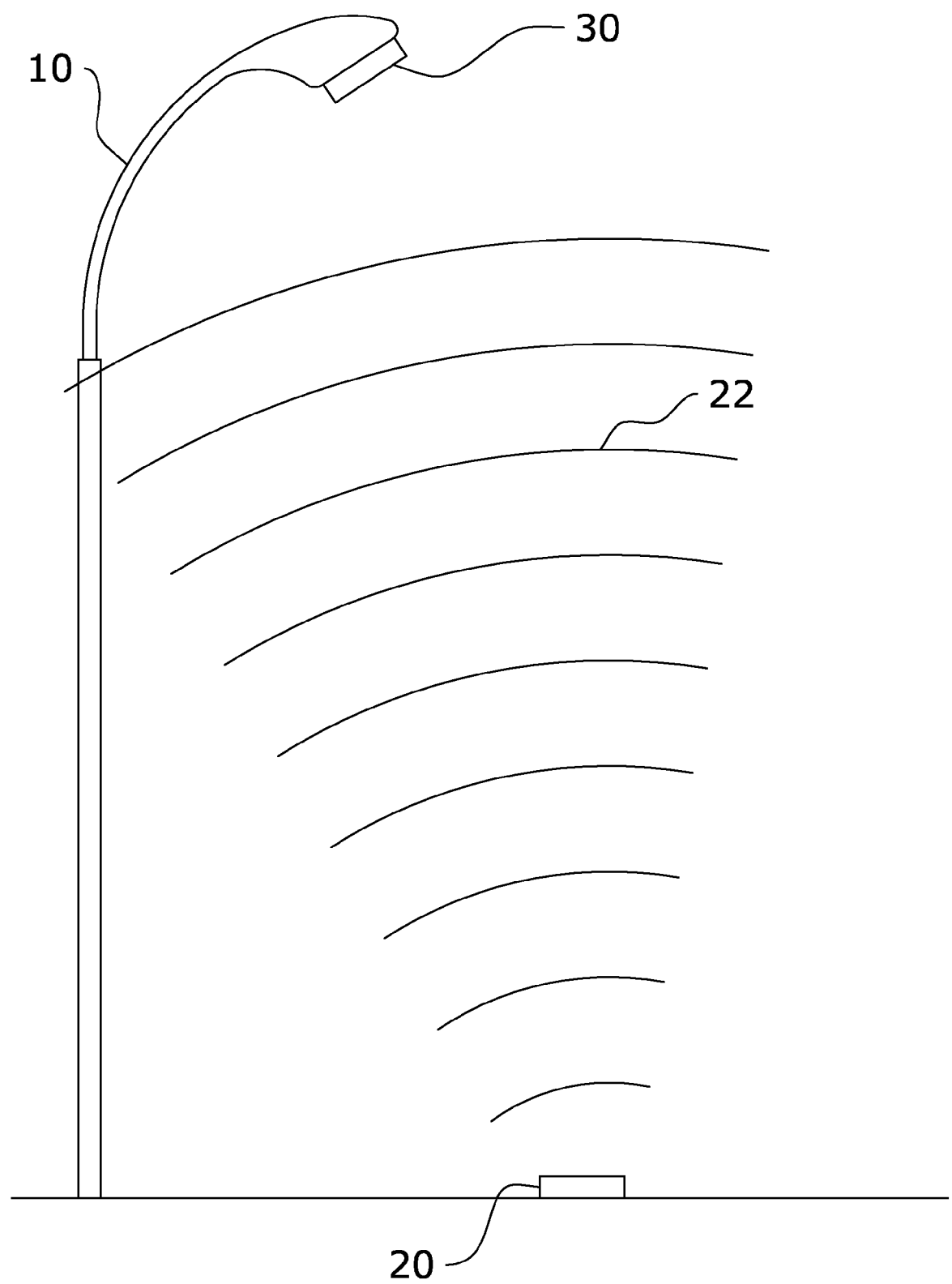
FIG. 5a is a front view of the main receiver attached to a pole above a transmitter.
Figure 5B:
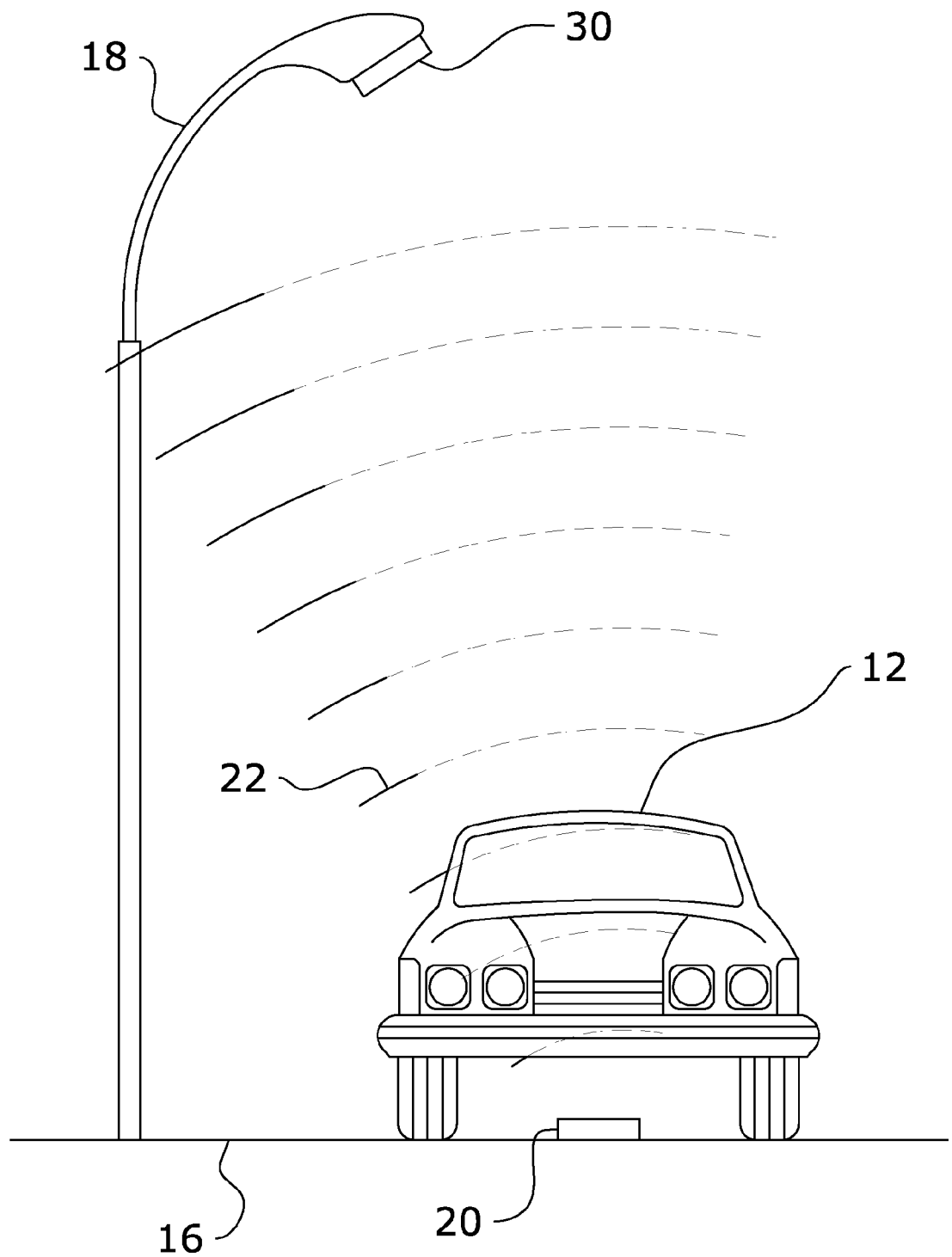
FIG. 5b is a front view of the main receiver attached to the pole above a transmitter and with an object positioned between thereof.
Figure 6A:
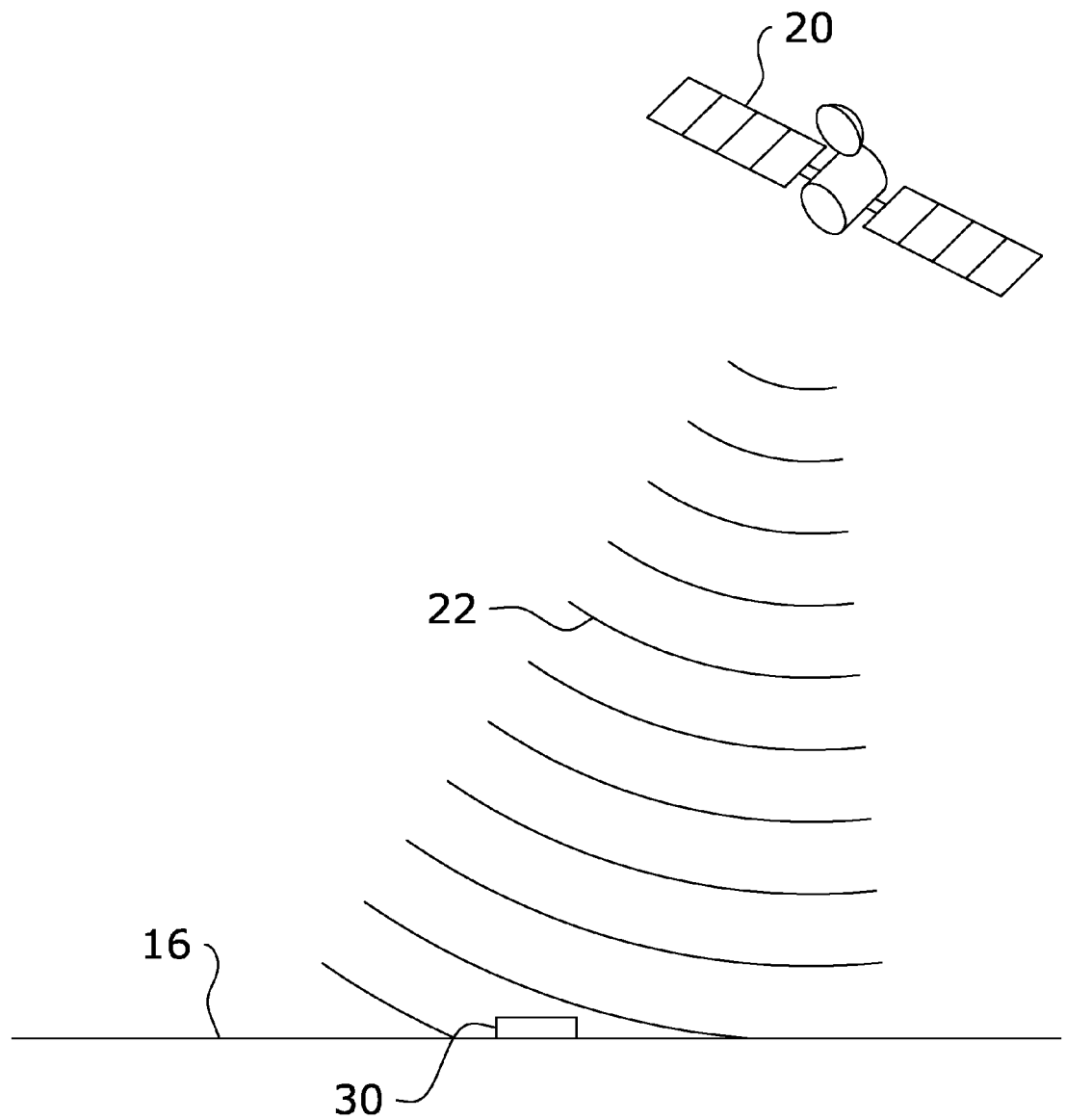
FIG. 6a is a front view of the transmitter comprised of a satellite.
Figure 6B:
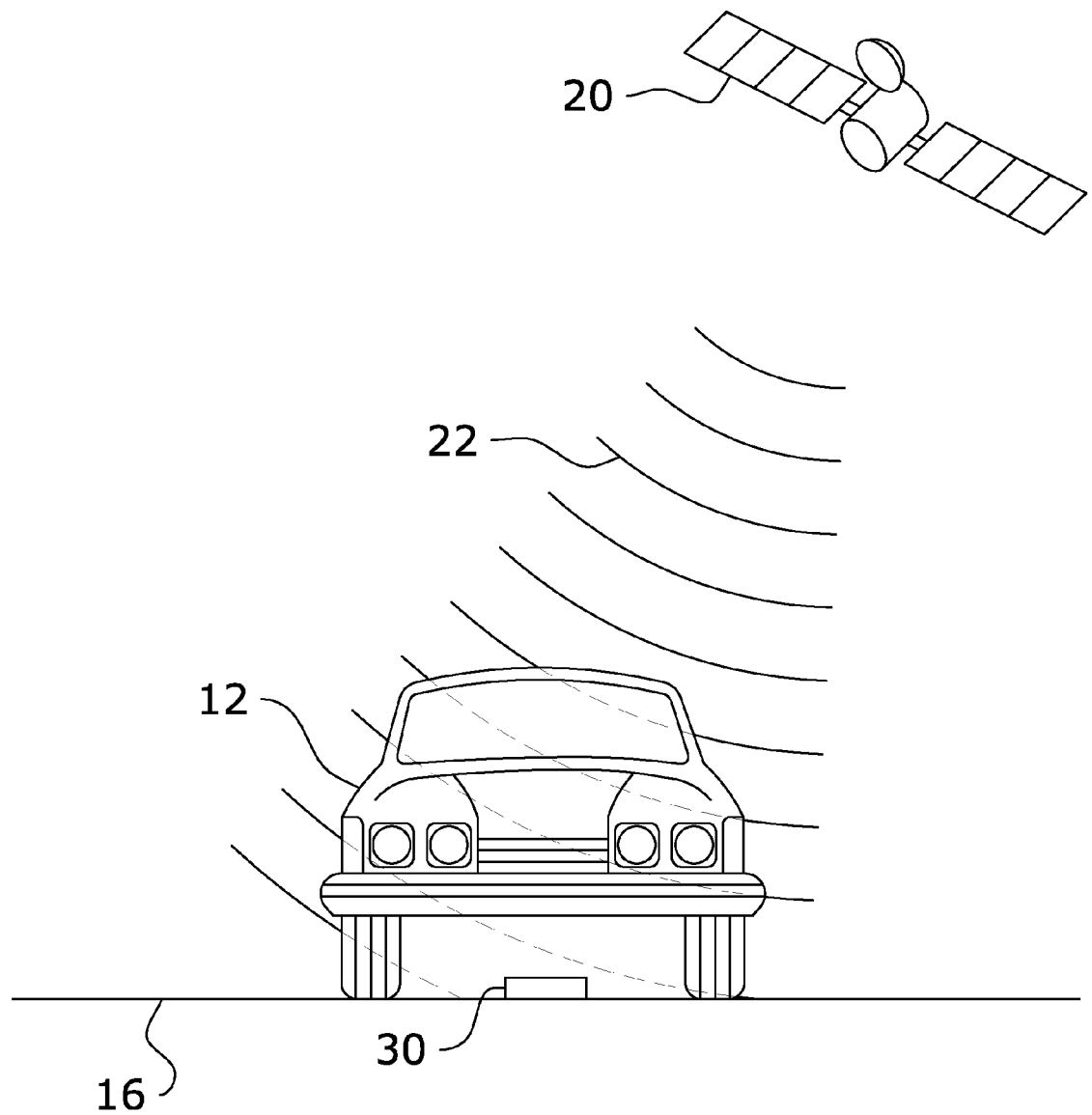
FIG. 6b is a front view of the transmitter comprised of a satellite and an object positioned within the signal path of the radio wave signal.

FIGS. 4a and 4b illustrate a signal transmitter 20 corresponding to a single main receiver 30 with the signal path being substantially vertical. However, a plurality of transmitters 20 may be used to provide the radio wave signal 22 for a single main receiver 30 as illustrated in FIG. 4c of the drawings. The only limitation of the number of transmitters 20 that may be utilized with a single receiver 30 is that when the angle increases for the signal path due to the horizontal distance away from the main receiver 30 there is less blockage of the radio wave signal 22 when a vehicle is positioned above a transmitter 20 due to the radio wave signal 22 being able to pass beneath the vehicle.

D. Main Receiver

The main receiver 30 is comprised of any device capable of and adapted for receiving, detecting and measuring the signal strength of a plurality of radio wave signals 22 sent by the transmitters 20. In an indoor parking structure, the main receiver 30 is preferably located in a central portion of a group of transmitters 20 that correspond to a group of parking spaces in a parking lot 17. The central portion may be the center of the transmitters 20 or within a reasonable range of the center of the group of transmitters 20 (e.g. within 20 feet of the center of the group of transmitters 20). FIG. 9 illustrates the main receiver 30 being positioned centrally with respect to 10 parking spaces and 10 corresponding transmitters 20 with five parking spaces on one side of the driveway and five parking spaces on the other side of the driveway of the parking lot 17.

FIGS. 4a through 5b illustrate the usage of a main receiver 30 that is attached to a structure such as a ceiling 14 within a building structure (e.g. the ceiling 14 of a parking ramp), an upper surface 16 of a floor or ground surface, an elevated structure that is taller than a vehicle such as a pole 18 (e.g. a light pole, utility pole, parking meter), the exterior of a building structure and the like. One embodiment of the invention may be directly integrated into a parking meter similar to the pole 18 wherein the detection of a vehicle is coupled with payment information and a system for data gathering, guidance and enforcement.

The main receiver 30 is preferably positioned near and above a rear portion of the vehicle when attached to a ceiling 14 wherein the main receiver 30 may serve as a visual indicator for the availability of the parking space with a guidance light 42 wherein the main receiver 30 and the control unit 40 are the same device or near one another. For example, the main receiver 30 may be attached to the ceiling 14 and vertically aligned with a location rearward of the parking space and a vehicle in the parking space. In addition, the main receiver 30 may be attached to the ceiling 14 and vertically aligned with a central portion of a driveway for the parking lot 17 such that the signals from one or more transmitters 20 in or near their respective parking spaces in the parking lot 17 may be used by the main receiver 30. As shown in FIGS. 9 and 10 of the drawings, the main receiver 30 is preferably positioned above a driveway of the parking lot 17 between opposing parking spaces in the parking lot. As illustrated in FIG. 9 of the drawings, the main receiver 30 is preferably used to provide a visual indication by the guidance light 42 to drivers as to the status of a group of parking spaces around the main receiver 30 such as, blue available for mobility parkers, red for full, yellow for almost full or green with many open parking spaces. The control unit 40 may also be connected to a display that provides a visual indication (e.g. a textual message such as "Full", "2 Spaces Available" or "No Spaces Available) to drivers regarding the status of the parking area near and around the main receiver 30 and the control unit 40

While the drawings illustrate the usage of a main receiver 30 that is either positioned horizontally with respect to the transmitters 20 or above the transmitters 20, it can be appreciated that the transmitter 20 and the main receiver 30 may be swapped in the drawings so that the main receiver 30 is below the transmitter 20.

While the transmitter 20 as discussed and illustrated in the drawings is attached to an upper surface 16 of a parking space below the main receiver 30, the transmitter 20 may also be positioned horizontally with respect to the main receiver 30 (see FIG. 1) or above the main receiver 30. When a vehicle is directly positioned above the transmitter 20, the signal strength of the radio wave signal 22 is significantly reduced and detected by the control unit 40 to indicate that a vehicle is present in the parking space of the parking lot 17. While the transmitter 20 may be positioned near or adjacent to the parking space and the main receiver 30 still receive a reduced signal strength for the radio wave signal 22, the amount of reduction in signal strength is not as significant. Hence, it is preferable that the transmitter 20 be positioned directly within the boundaries of the parking spot to be measured. However, the transmitter 20 may be positioned outside of the parking space and/or the parking lot 17 in a location that the main receiver 30 is able to measure a degradation of the radio wave signal 22 when a vehicle is present within the parking space.

E. Control Receiver

In addition to the main receiver 30, a control receiver 50 is preferably utilized to provide an unobstructed control measurement of the signal strength for the radio wave signal 22 to compare to the measured signal strength measured by the main receiver 30. The control receiver 50 provides information to the control unit 40 as to the overall quality of the radio wave signal 22 and a baseline for signal strength to help prevent false detections of a vehicle. The control receiver 50 is adapted for receiving, detecting and measuring the radio wave signal 22 just as the main receiver 30. The control receiver 50 is positioned a distance away from the main receiver 30 (either horizontally distanced and/or vertically distanced).

The control receiver 50 is optional and is utilized to ensure that the signal measured by the main receiver 30 is accurate when a vehicle isn't present and accurate when a vehicle is present. For example, if the main receiver 30 detects a significant drop in the signal strength of the radio wave signal 22 and if a corresponding significant drop in the signal strength of the radio wave signal 22 is measured by the control receiver 50, then the control unit 40 determines that the drop in signal strength is due to something other than a vehicle present and therefore the control unit 40 does not indicate that a vehicle is present.

The control receiver 50 is preferably positioned above the main receiver 30 and further preferably positioned at a height above the upper surface 16 of the parking lot 17 to avoid interference with the radio wave signal 22 by a vehicle driving by or when parked. For example, the control receiver 50 may be attached to the upper portion of a pole 18 (e.g. a light pole 18, a utility pole 18, etc.) a nearby building structure or other structure that is vertically positioned above the upper surface 16 of the parking lot 17. The control receiver 50 may be horizontally positioned away from the main receiver 30 in a position that will not be interfered with by a vehicle (e.g. on the upper surface of the parking lot 17 between two parking spaces, or a nearby grass area where vehicles would not pass over).

The control receiver 50 is in communication with the control unit 40 to provide a control signal that is never obstructed by the vehicle, wherein the control unit 40 compares a control signal strength of the control signal to the signal strength of the radio wave signal 22 received by the main receiver 30, wherein the control unit 40 determines that the vehicle is present if a difference between the control signal strength and the signal strength of the radio wave signal 22 received by the main receiver 30 is greater than a threshold difference, and wherein the control unit 40 determines that the vehicle is not present if a difference between the control signal strength and the signal strength of the radio wave signal 22 received by the main receiver 30 is less than a threshold difference.

Unless otherwise defined, all technical and scientific terms used herein have the same meaning as commonly understood by one of ordinary skill in the art to which this invention belongs. Although methods and materials similar to or equivalent to those described herein can be used in the practice or testing of the present invention, suitable methods and materials are described above. All publications, patent applications, patents, and other references mentioned herein are incorporated by reference in their entirety to the extent allowed by applicable law and regulations. The present invention may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

The invention claimed is:

1. A vehicle presence detection system, comprising:
   a plurality of transmitters, wherein each of said plurality of transmitters is associated with a parking space in a group of parking spaces to monitor, wherein said plurality of transmitters are each attached to a parking space in said group of parking spaces so that when a vehicle is parked in said parking space said vehicle substantially covers a transmitter for said parking space;
   a main receiver adapted for receiving a radio wave signal from each of said plurality of transmitters, wherein said main receiver is attached to a ceiling within a building structure above said plurality of transmitters, wherein said main receiver is positioned in a central portion of said plurality of transmitters; and
   a control unit in communication with said main receiver, wherein said control unit determines a signal strength of said radio wave signal received by said main receiver, wherein said control unit determines that a vehicle is near a selected transmitter of said plurality of transmitters when said signal strength of said radio wave signal for said selected transmitter is reduced by a threshold loss.

2. The vehicle presence detection system of claim 1, wherein said plurality of transmitters are each comprised of a Bluetooth device.

3. The vehicle presence detection system of claim 1, wherein said plurality of transmitters are each attached to an upper surface of a corresponding parking space.

4. The vehicle presence detection system of claim 1, wherein said control unit determines that said vehicle is present when said vehicle is positioned between one of said plurality of transmitters and said main receiver.

5. The vehicle presence detection system of claim 1, wherein said control unit calculates changes in said signal strength of said radio wave signal over a period of time and averages said changes to provide an average change in said signal strength of said radio wave signal.

6. The vehicle presence detection system of claim 5, wherein said control unit determines that said vehicle is present if a change in said signal strength of said radio wave signal is greater than a multiple of said average change.

7. The vehicle presence detection system of claim 6, wherein said multiple is at least four.

8. The vehicle presence detection system of claim 1, including a visual indicator in communication with said control unit to visually indicate to drivers the availability of parking space within said group of parking spaces.

9. The vehicle presence detection system of claim 8, wherein said visual indicator is comprised of a guidance light.

10. The vehicle presence detection system of claim 9, wherein said main receiver, said control unit and said guidance light are comprised of a single device.

11. The vehicle presence detection system of claim 1, wherein said main receiver is positioned above a pathway, wherein said pathway is positioned between a first row of parking spaces and a second row of parking spaces of said group of parking spaces.

12. The vehicle presence detection system of claim 11, wherein said group of parking spaces have a first side and a second side opposing said first side, and a first end and a second end opposing said first end, wherein said main receiver is substantially centrally positioned between said first side and said second side of said group of parking spaces, and wherein said main receiver is substantially centrally positioned between said first end and said second end of said group of parking spaces.

13. The vehicle presence detection system of claim 1, wherein said group of parking spaces have a first side and a second side opposing said first side, and a first end and a second end opposing said first end, wherein said main receiver is substantially centrally positioned between said first side and said second side of said group of parking spaces, and wherein said main receiver is substantially centrally positioned between said first end and said second end of said group of parking spaces.

14. A vehicle presence detection system, comprising:
a plurality of transmitters, wherein each of said plurality of transmitters is associated with a parking space in a group of parking spaces to monitor, wherein said plurality of transmitters are each attached to a parking space in said group of parking spaces so that when a vehicle is parked in said parking space said vehicle substantially covers a transmitter for said parking space;
a main receiver adapted for receiving a radio wave signal from each of said plurality of transmitters wherein said main receiver is attached to a ceiling within a building structure above said plurality of transmitters, wherein said main receiver is positioned in a central portion of said plurality of transmitters;
a control unit in communication with said main receiver, wherein said control unit determines a signal strength of said radio wave signal received by said main receiver, wherein said control unit determines that a vehicle is near a selected transmitter of said plurality of transmitters when said signal strength of said radio wave signal for said selected transmitter is reduced by a threshold loss; and
a visual indicator in communication with said control unit to visually indicate to drives the availability of parking space within said group of parking spaces.

15. The vehicle presence detection system of claim 14, wherein said visual indicator is comprised of a guidance light.

16. The vehicle presence detection system of claim 15, wherein said main receiver, said control unit and said guidance light are comprised of a single device.

17. The vehicle presence detection system of claim 14, wherein said main receiver is positioned above a pathway, wherein said pathway is positioned between a first row of parking spaces and a second row of parking spaces of said group of parking spaces.

18. The vehicle presence detection system of claim 17, wherein said group of parking spaces have a first side and a second side opposing said first side, and a first end and a second end opposing said first end, wherein said main receiver is substantially centrally positioned between said first side and said second side of said group of parking spaces, and wherein said main receiver is substantially centrally positioned between said first end and said second end of said group of parking spaces.

19. The vehicle presence detection system of claim 14, wherein said group of parking spaces have a first side and a second side opposing said first side, and a first end and a second end opposing said first end, wherein said main receiver is substantially centrally positioned between said first side and said second side of said group of parking spaces, and wherein said main receiver is substantially centrally positioned between said first end and said second end of said group of parking spaces.

20. A vehicle presence detection system, comprising:
a plurality of transmitters, wherein each of said plurality of transmitters is associated with a parking space in a group of parking spaces to monitor;
a main receiver adapted for receiving a radio wave signal from each of said plurality of transmitters, wherein said main receiver is positioned in a central portion of said plurality of transmitters;
a control unit in communication with said main receiver, wherein said control unit determines a signal strength of said radio wave signal received by said main receiver, wherein said control unit determines that a vehicle is near a selected transmitter of said plurality of transmitters when said signal strength of said radio wave signal for said selected transmitter is reduced by a threshold loss, wherein said control unit determines that said vehicle is present when said vehicle is positioned between one of said plurality of transmitters and said main receiver; and
a visual indicator in communication with said control unit to visually indicate to drives the availability of parking space within said group of parking spaces;
wherein said main receiver, said control unit and said guidance light are comprised of a single device;
wherein said main receiver is attached to ceiling above said group of parking spaces;
wherein said plurality of transmitters are each attached to an upper surface of a parking space in said group of parking spaces so that when a vehicle is parked in said parking space said vehicle substantially covers a transmitter for said parking space;
wherein said plurality of transmitters are each comprised of a Bluetooth device;
wherein said control unit calculates changes in said signal strength of said radio wave signal over a period of time and averages said changes to provide an average change in said signal strength of said radio wave signal;
wherein said control unit determines that said vehicle is present if a change in said signal strength of said radio wave signal is greater than a multiple of said average change.

* * * * *